Dec. 1, 1959 I. SISLIK 2,915,272

SUPPORT AND PLATE-AND-SUPPORT ASSEMBLY

Filed Oct. 5, 1955

INVENTOR.
Ivan Sislik

BY Ramsey, Chisholm + Hilde

ATTORNEYS 2,915,272
Patented Dec. 1, 1959

1

2,915,272

SUPPORT AND PLATE-AND-SUPPORT ASSEMBLY

Ivan Sislik, Bound Brook, N.J., assignor to The Palnut Company, Irvington, N.J., a corporation of New Jersey Application October 5, 1955, Serial No. 538,635

6 Claims. (Cl. 248—220.5)

The present invention has special utility in mounting a circut unit on a chassis plate and will be disclosed and discussed as so applied.

Much electrical apparatus and equipment makes use of a chassis plate on which the various circuit units are mounted, the chassis plate being grounded in many instances. It is often desirable to mount a circuit unit in spaced relation to the chassis plate, to guard against unintended current flow between the circuit unit and the chassis plate and also to minimize the electrostatic capacity between the circuit unit and ground. For speed and convenience of assembly it is desirable that a circuit unit be mountable on the chassis plate by simple motions which can be executed from one side of the plate. It is also desirable that a circuit unit be readily removable for servicing or replacement. To cushion the circuit unit against shock it is desirable, as regards various circuit units, that there be a measure of yieldability and resiliency in the mechanical connection between the circuit unit and the chassis plate.

Among the objects of present invention are to provide a support, and a support-and-plate assembly, for reliably mounting an element in spaced relation to a plate, to provide such a support and assembly in which the element is mountable on the plate by straight-line motion executed from one side of the plate, to provide such a support and assembly in which the mounted element is readily removable, to provide such a support and assembly in which there is a measure of yielding resiliency between the mounted element and the plate, to provide a simple inexpensive mechanical support for use in such an assembly, to generally improve such a support and assembly and to reduce the time and cost of mounting an element on a plate.

Other objects, and objects relating to details of manufacture and use, will be apparent from the detailed description which follows.

My invention is defined in the appended claims. The element may be mounted on either side of the plate, and the plate may be vertical, horizontal, or in any inclined position. Thus, reference to parts on the basis of their oriented position shown in the accompanying drawing, or on the basis of any other oriented position, does not imply any limitation as to the position in which the assembly may be used. In the description and the claims parts may at times be identified by specific names for clarity and convenience, but such nomenclature is to be understood as having the broadest meaning consistent with the context and with the concept of my invention as distinguished from the pertinent prior art. The best mode in which I have contemplated applying my invention is illustrated in the accompanying drawing forming part of this specification, in which:

Figure 1:
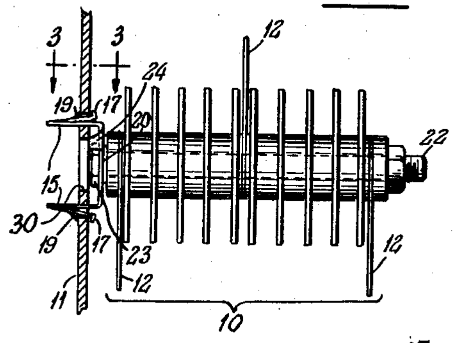
Fig. 1 is a side elevation, partially in section, showing a circuit unit mounted on a chassis plate with the use of the present invention.
Figure 2:
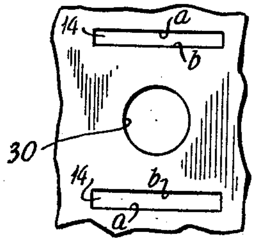
Fig. 2 is a front elevation of that portion of the chassis

2 plate which confronts the circuit unit in Fig. 1, drawn to twice the scale of Fig. 1.

Figure 3:
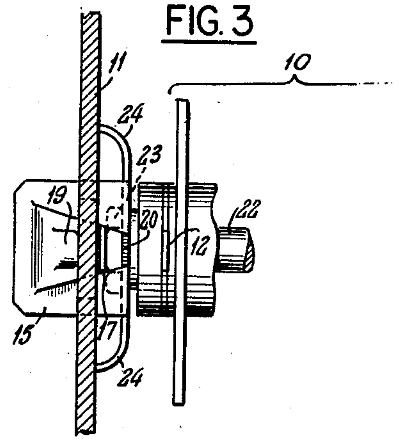

Fig. 3 is a detail view taken at line 3—3 of Fig. 1, drawn to twice the scale of Fig. 1.

Figure 4:
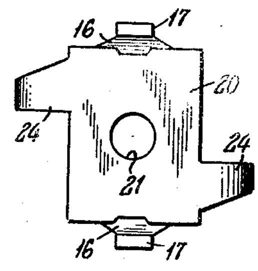

Fig. 4 shows the support which mechanically connects the circuit unit to the chassis plate, viewed as from the right-hand side of Fig. 1 and drawn to twice the scale of Fig. 1.

Figure 5:
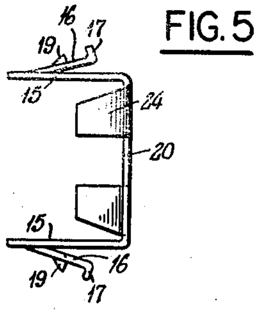

Fig. 5 shows the support of Fig. 4, viewed as from the front of Fig. 1 and drawn to twice the scale of Fig. 1.

Figure 6:
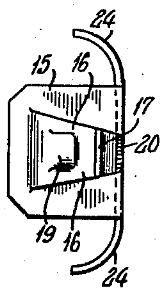

Fig. 6 shows the support of Fig. 4, viewed as from the top of Fig. 1 and drawn to twice the scale of Fig. 1.

Fig. 1 shows a circuit unit 10 mounted in spaced relation to one face of a chassis plate 11. In this instance the circuit unit is a rectifier having three terminals 12 through which it is connected into the circuit.

The chassis plate is provided with parallel slots 14, 14 which are narrow and are spaced a substantial distance apart as shown. Flat spring legs 15, 15 are connected to the circuit unit and extend through the slots 14, 14, respectively. Latching tongues 16, 16 are struck outwardly from the legs. The free ends of the tongues are bent outwardly and lie perpendicular to the plane of the tongues, forming projections 17, 17 which overlie one face of the chassis plate. Scoop-shaped portions are stamped out from the body of the tongues, forming projections 19, 19 which overlie the opposite face of the chassis plate. Each projection 19 is so formed that the end of the scoop formation confronts the chassis plate and lies in a plane parallel to the face of the chassis plate, or nearly so.

The connection of spring legs 15, 15 to the circuit unit may be through a generally rectangular bridge 20 which is provided with a central hole 21 (Fig. 4) that receives the shank of a bolt 22, the head 23 of the bolt lying against the bridge and clamping it to the circuit unit. As is perhaps best seen in Fig. 5, the legs 15, 15 are in parallel spaced relation perpendicular to the bridge 20. The legs extend from two opposite edges of the bridge 20 and, for convenience of reference, these edges will be considered as the "ends" of the bridge. Spring fingers 24, 24 extend for a substantial distance, as shown in Figs. 4 and 6, from the other two edges of the bridge 20. For convenience of reference these other two edges will be considered as the "sides" of the bridge 20. The fingers 24, 24 are located adjacent to diagonally opposite corners of bridge 20, as shown in Fig. 4; and these fingers curve toward the chassis plate 11, as will be clear from Fig. 6. The free ends of these fingers 24, 24 resiliently engage the chassis plate with a substantial degree of pressure, thereby drawing the projections 19, 19 firmly against the opposite face of the chassis plate. The range of action of spring fingers 24, 24 is such as to draw projections 19, 19 firmly against the chassis plate and obviate lost motion in the connection between the spring legs 15, 15 and the chassis plate even though projections 17 be placed from projections 19 by a distance which adapts them for cooperation with chassis plates of different thicknesses, e.g., thicknesses from .033" to .066".

To mount the circuit unit 10 on the chassis plate 11, it is only necessary to insert the legs 15, 15 into the slots 14, 14 and press the circuit unit toward the chassis plate by straight-line motion. Due to their scoop shape, the projections 19, 19 ride over the opposed edges *a*, *a* of the pair of slots 14, 14 and then the projections 19, 19 and 17, 17 are snapped into overlying relation to the chassis plate by the spring action of tongues 16, 16.

When a force is exerted downwardly on the circuit unit 10 as shown in Fig. 1 the contact between upper leg 15 and edge *b* of upper slot 14 prevents any movement of upper leg 15 which would permit upper projection 19 to become disengaged from the chassis plate; and the turning moment imposed upon the circuit unit is counteracted by the conjoint engagement of upper projection 19 and lower projection 17 with the respective faces of the chassis plate 11. When a force is exerted upwardly on the circuit unit as shown in Fig. 1 the contact between lower leg 15 and edge *b* of lower slot 14 prevents any movement of lower leg 15 which would permit lower projection 19 to become disengaged from the chassis plate; and the turning moment imposed upon the circuit unit is counteracted by the conjoint engagement of lower projection 19 and upper projection 17 with the respective faces of chassis plate 11. When horizontal forces are imposed upon the circuit unit as shown in Fig. 1, the projections 19, 19 serve conjointly to prevent withdrawal of legs 15, 15 from the slots 14, 14, and lateral stability is provided by the axis-remote engagement of spring fingers 24, 24 with that face of the chassis plate 10 which is opposite to the face engaged by projections 19, 19.

From the preceding paragraph it will be seen that the support-and-plate assembly is one which securely retains the circuit unit in its mounted position with respect to the chassis plate, notwithstanding the spaced relation between the circuit unit and the chassis plate. However, legs 15, 15, bridge 20, and fingers 24, 24 possess sufficient yieldability and resiliency to be helpful in reducing the transmission of mechanical shocks from the chassis plate to the circuit unit. Also, each spring latching-tongue 16 can be pushed back readily, by pressure applied with the tip of a screw driver or the tip of a fingernail, to disengage projection 19 and permit removal of the circuit unit for servicing or replacement.

Legs 15, 15, latching tongues 16, 16, bridge 20, and fingers 24, 24 may be made in one piece from a sheet of spring steel, the resultant piece being hardened and tempered after forming. In some instances it may be desired to attach this piece to the nut end of bolt 22 and mount the circuit unit in reversed position. This will cause the free end of the bolt to project toward the chassis plate 11, and a hole 30 in the chassis plate provides clearance for the end of the bolt. The bolt being of small diameter and the hole 30 being of sufficiently larger diameter, the capacity to ground of the circuit unit is not greatly increased.

The optimum spacing of slots 14, 14 and the optimum spacing of the tips of fingers 24, 24 will depend upon the overhanging weight of the circuit unit. For a circuit unit weighing approximately 2 oz. and having its center of gravity about 1⅜ inches from the chassis plate, I have used a distance of 19/32″ between edges *b, b* of slots 14, 14, a width of 1/16″ for each slot 14, a width of ½″ for bridge 20 and the legs 15, 15, a distance of 15/16″ between the tips of fingers 24, 24, and a thickness of .013″ for the sheet of spring steel from which the legs, bridge and fingers are made.

I claim:

1. A one-piece support of springy sheet metal for resiliently mounting an element in spaced relation to a plate that is apertured to provide a pair of laterally-spaced opposed edges, said support being telescopically engageable with the plate when the element to be mounted has been preattached to the support, and said support comprising: a generally rectangular bridge adapted to be positioned on one side of the plate in spaced relation thereto, the bridge being formed for attachment thereto of the element to be mounted; two wide spring legs that are generally-planar and are individual to the two ends of the bridge, the legs being integral with the ends of the bridge and extending perpendicularly therefrom, the legs lying in parallel planes and having free terminal ends located in such planes, and the legs being adapted to extend through the plate in juxtaposition to said opposed edges of the plate with the free terminal ends of the legs positioned remote from the plate on the side opposite to the bridge; spring latching-tongues struck laterally from the legs and disposed at small angles to the planes of the legs, the tongues being attached to the legs near the free terminal ends of the legs only and extending toward the bridge; latching means on each latching tongue, each latching means having spaced parallel surfaces extending perpendicularly from the latching tongue for receiving the plate between them, the spacing between such surfaces being greater than the thickness of the plate to be received therein to thereby afford a measure of movement of the legs, and the latching means being spaced from the bridge sufficiently to hold the bridge in spaced relation to the plate; and spring means extending from the bridge to engage the plate and thereby yieldingly bias against the plate those latching-means surfaces that are on the opposite side of the plate.

2. A support as in claim 1 in which the latching means on each latching tongue consists of a bent-over end portion of the tongue and a portion struck laterally from the body of the tongue and extending in the same direction as the bent-over end portion.

3. A support as in claim 2 in which the end portion is outwardly bent, the portion struck from the body of the tongue is outwardly struck, and the spring means extending from the bridge consists of cantilever springs that extend from the sides of the bridge.

4. A support as in claim 1 in combination with a plate having a pair of elongated narrow slots in parallel spaced relation, the legs of the support passing through the slots, and each slot having a pair of closely-spaced longitudinal-edges between which the slot-embraced leg is confined whereby the slots prevent marked lateral movement of the legs and thereby protect the latching means on the tongues against fortuitous disengagement from the plate.

5. A support as in claim 2 in combination with a plate having a pair of elongated narrow slots in parallel spaced relation, the legs of the support passing through the slots, and each slot having a pair of closely-spaced longitudinal-edges between which the slot-embraced leg is confined whereby the slots prevent marked lateral movement of the legs and thereby protect the latching means on the tongues against fortuitous disengagement from the plate.

6. A support as in claim 3 in combination with a plate having a pair of elongated narrow slots in parallel spaced relation, the legs of the support passing through the slots, and each slot having a pair of closely-spaced longitudinal-edges between which the slot-embraced leg is confined whereby the slots prevent marked lateral movement of the legs and thereby protect the latching means on the tongues against fortuitous disengagement from the plate.

References Cited in the file of this patent

UNITED STATES PATENTS

| | | |
|---|---|---|
| 2,300,478 | Wiley | Nov. 3, 1942 |
| 2,400,545 | Kost | May 21, 1946 |
| 2,626,772 | Flora | Jan. 27, 1953 |
| 2,639,311 | Cook | May 19, 1953 |
| 2,703,662 | Meyer | Mar. 8, 1955 |
| 2,721,245 | Arisman et al. | Oct. 18, 1955 |
| 2,798,271 | Flora | July 9, 1957 |